United States Patent Office 3,509,720
Patented May 5, 1970

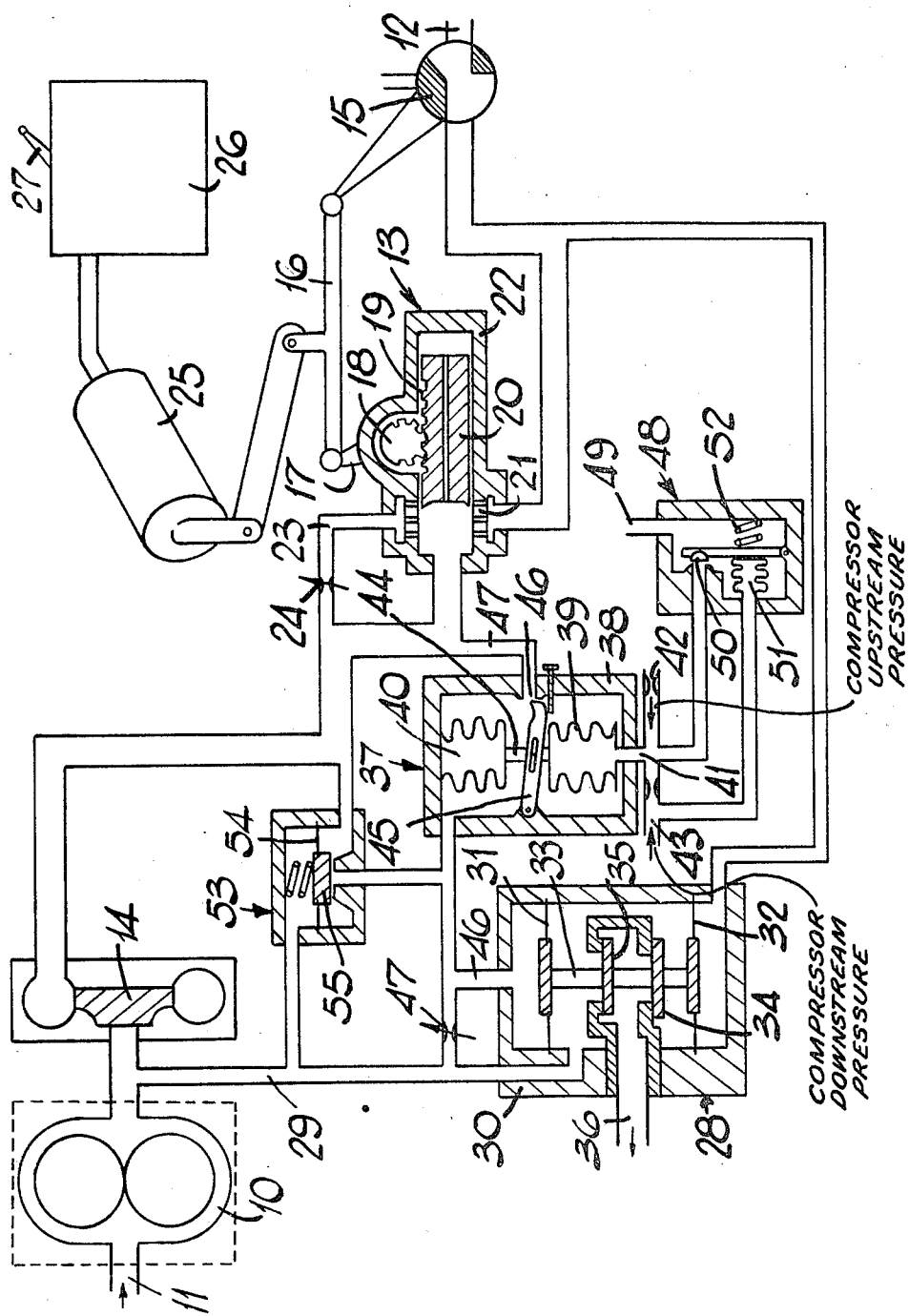

3,509,720
FUEL SYSTEMS FOR GAS TURBINE ENGINES
Eugene Harold Warne, Solihull, England, assignor to Joseph Lucas (Industries) Limited, Birmingham, England, a British company
Filed Dec. 19, 1967, Ser. No. 691,848
Int. Cl. F02c 9/10
U.S. Cl. 60—39.28                              4 Claims

ABSTRACT OF THE DISCLOSURE

A gas turbine engine fuel system comprising a first positive displacement type pump, a centrifugal pump in series with the first pump, an outlet passage from the pumps, a throttle in the outlet passage downstream of the pumps, a spill passage for excess fuel and connected between the first and second pumps, a device response to the pressure drop created by the throttle and arranged to control the spill of fuel through the spill passage, and means responsive to compressor pressures within the engine, for controlling the device which controls the spill flow.

---

This invention relates to fuel systems for gas turbine engines and has for its object to provide such a system in a convenient form.

In accordance with the present invention a fuel system for a gas turbine engine comprises, in combination, an engine driven positive displacement pump, an outlet passage from the pump, a throttle in said outlet passage for controlling fuel flow to the engine, a further engine driven pump in the outlet passage arranged between the first pump and the throttle, the further pump being of a kind in which its delivery pressure is a function of its speed, a device which is responsive to changes in the pressure drop across the throttle, said device being arranged to control the rate of spill of fuel from the outlet passage at a position downstream of the first pump but upstream of the further pump, means responsive to air pressure changes in the compressor stage of the engine for varying the response of said device and a manually operable control for the throttle.

The invention will now be described with reference to the accompanying drawing which illustrates diagrammatically a fuel system constructed in accordance with the invention.

The fuel system illustrated is intended for use with a gas turbine engine and comprises an engine driven positive displacement pump 10 which in this example is a gear type pump. This obtains a supply of liquid fuel through an inlet passage 11 from a reservoir (not shown).

The pump 10 is arranged to supply fuel to burners (not shown) in an engine connected to an outlet passage 12, there being, between the pump 10 and the burners, a throttle indicated at 13 and a further pump 14. The further pump 14 is of the kind in which the delivery pressure is at least approximately proportional to the square of the speed of rotation, this further pump 14 being a centrifugal pump also driven by the engine.

In the outlet passage 12 there is also a shutoff cock 15 which is connected through a linkage 16 with a lever 17 for controlling the opening of the throttle 13, the cock 15 being arranged, as illustrated, to provide full flow despite substantial changes in the postion of the linkage, the shutoff cock 15 being only closed at an extreme position of the linkage.

The throttle 13 is controlled by the lever 17 through a pinion 18 meshing with a rack 19 formed on a slidable member 20 arranged to control the flow of fuel through a plurality of openings 21 in a body 22 of the throttle 13. There is a bypass passage 23 having a variable restrictor 24 which is arranged to provide a flow of fuel for idling of the engine, by providing a direct supply to the passages 21, when the throttle 16 is in a position in which it is substantially closed.

The linkage 16 is actuated through an electric motor indicated at 25 from apparatus indicated diagrammatically at 26, into which is fed electrical signals related to engine speed, and engine temperature, and into which is also fed a manual signal through a lever 27 under the control of an operator. This apparatus 26 provides a trim on the throttle control lever 27, so that the full flow to the engine, as selected by the operator controlled lever 27, is modified in accordance with running conditions of the engine.

Arranged to be indirectly responsive to changes in the pressure drop across the throttle 13 is a device indicated at 28 for controlling the rate of spill of fuel from a position between the pump 10 and the further pump 14, through a passage 29. The device 28 has a body 30, with the interior of which the passage 29 communicates. There is also a pair of diaphragms 31, 32, the passage 29 communicating with the space between the two diaphragms. The diaphragms 31, 32 are connected by a member 33 carrying two valve closure members 34, 35 arranged to control the flow of fuel from the passage 29 to a drain passage 36 which communicates with the pump inlet or with a reservoir or other relatively low pressure portion of the system.

The pressure at the upstream side of the throttle 13, which is applied to the diaphragm 31, is modified by a means 37 responsive to the pressure of air in the compressor stage of the engine. The means 37 comprises a body 38 containing a pair of interconnected capsules 39, 40, the latter being evacuated and the former being connected to a supply passage 41 in which is exerted a pressure which is related to the ratio of the pressures at the upstream and downstream sides of the compressors respectively. These pressures are exerted through restricted passages 42, 43 respectively. The capsules 39, 40 are connected through a member 44 engaging a lever 45 which is pivotally mounted on the body 38 and has a knife edge 46 for controlling the flow of fuel through a passage 47 communicating with the upstream side of the throttle 13. The interior of the body 38 is in communication with the space within the body 28 at the appropriate side of the diaphragm 31 therein through a passage 46. The passage 46 also communicates through an adjustable restrictor 47 with the passage 29, which is connected between the pumps 10 and 14.

Furthermore, arranged to modify the pressure in the passage 41 leading to the capsule 39, is a device 48 having an air escape passage 49 and a valve 50 which is spring loaded towards its closed position. The opening of the valve 50 is governed by the pressure at the downstream side of the compressor stage of the engine. This pressure exists, in use, in the passage 43, and is applied to a capsule 51 acting in opposition to the valve spring 52. The device is thus arranged to limit the maximum value of the compressor downstream pressure which can be achieved by limiting the amount of fuel delivered to the engine, when this pressure reaches the desired limit.

Arranged to bypass the device 37 and affording communication between the pump outlet passage and the spill passage 29 is a valve 53 containing a diaphragm 54. This carries a valve closure member 55 which is spring-loaded towards its closed position. This valve 53 is arranged, when the engine reaches a predetermined speed and the further pump 14 generates a predetermined pressure in the outlet passage to the burners, to open to permit additional escape of fuel from the system.

With the arrangement illustrated it is possible to employ a positive displacement type pump 10 which is relatively inexpensive, this pump delivering a greater quantity of fuel than is required by the engine and the necessary spill being controlled in accordance with compressor pressure and the speed signal derived from the further pump 14.

Having thus described my invention what I claim as new and desire to secure by Letters Patent is:

1. A fuel system for a gas turbine engine comprising, in combination, a first engine driven positive displacement pump, an outlet passage from the pump, a throttle in said outlet passage for controlling fuel flow to the engine, a manually operable control for the throttle, a further engine driven pump in the outlet passage arranged between the first pump and the throttle, the further pump being a centrifugal pump whereby the pressure of the fuel delivered thereby is proportional to its speed, a spill passage for escape of excess fuel, said spill passage being connected to the outlet passage between the first and the further pumps, wherein the fuel is withdrawn from between said pumps, a device which is responsive to changes in the pressure drop across the throttle, said device being arranged to control the rate of spill of fuel through the spill passage, and means responsive to air pressure changes in the compressor stage of the engine for varying the operation of said device.

2. A fuel system as claimed in claim 1 in which the positive displacement pump is a gear type pump and the further pump is a centrifugal type pump.

3. A fuel system as claimed in claim 1 having modifying means associated with the manual control for the throttle, said means being responsive to engine operating conditions.

4. A fuel system as claimed in claim 1 having a further device arranged to modify the operation of the means which is responsive to compressor air pressure changes, said further device being also responsive to compressor air pressure changes.

References Cited
UNITED STATES PATENTS

| | | | |
|---|---|---|---|
| 2,658,566 | 11/1953 | Wirth | 60—39.28 |
| 3,128,822 | 4/1964 | Tyler | 60—39.28 |
| 3,349,557 | 10/1967 | Johnson | 60—39.28 |

MARK NEWMAN, Primary Examiner